(12) United States Patent
Kim et al.

(10) Patent No.: US 10,018,840 B2
(45) Date of Patent: Jul. 10, 2018

(54) HEAD UP DISPLAY FOR VEHICLE

(71) Applicant: LG ELECTRONICS INC., Seoul (KR)

(72) Inventors: Youngjin Kim, Seoul (KR); Juhyeok Ryu, Seoul (KR); Dongwook Kim, Seoul (KR); Kyoungil Lee, Seoul (KR); Seunggyu Lee, Seoul (KR)

(73) Assignee: LG Electronics Inc., Seoul (KR)

(*) Notice: Subject to any disclaimer, the term of this patent is extended or adjusted under 35 U.S.C. 154(b) by 54 days.

(21) Appl. No.: 15/335,857

(22) Filed: Oct. 27, 2016

(65) Prior Publication Data

US 2017/0235136 A1 Aug. 17, 2017

Related U.S. Application Data

(60) Provisional application No. 62/340,503, filed on May 23, 2016, provisional application No. 62/294,303, filed on Feb. 12, 2016.

(30) Foreign Application Priority Data

Jun. 24, 2016 (KR) .......................... 10-2016-0079047

(51) Int. Cl.
*G02B 5/30* (2006.01)
*G02B 27/01* (2006.01)
(Continued)

(52) U.S. Cl.
CPC .......... *G02B 27/0101* (2013.01); *B60K 35/00* (2013.01); *G02B 5/3083* (2013.01);
(Continued)

(58) Field of Classification Search
CPC ...... G02B 5/30; G02B 5/3025; G02B 5/3033; G02B 5/3041; G02B 5/305; G02B 5/3083;
(Continued)

(56) References Cited

U.S. PATENT DOCUMENTS 631,886 A 8/1899 Baum
6,318,862 B1 11/2001 Sarayeddine
(Continued)

FOREIGN PATENT DOCUMENTS

JP 2006-91489 A 4/2006
KR 10-2008-0044040 A 5/2008
(Continued)

*Primary Examiner* — Arnel C Lavarias
(74) *Attorney, Agent, or Firm* — Birch, Stewart, Kolasch & Birch, LLP

(57) ABSTRACT

A head up display for a vehicle according to an embodiment includes a display panel configured to emit an image light; a polarized light plate configured to make the image light emitted from the display linearly polarized; a reflective mirror configured to reflect the image light onto a windshield of a vehicle; a polarized light reflective mirror configured to be disposed to face the reflective mirror; and a phase delay mirror configured to convert a phase of the light inputted from the polarized light plate and reflect the converted phase to the polarized light reflective mirror, and to convert a phase of the light reflected from the polarized light reflective mirror and reflect the converted phase to the polarized light reflective mirror, thereby minimizing a width in the forward and backward direction.

20 Claims, 5 Drawing Sheets

(51) Int. Cl.
*G02B 27/28* (2006.01)
*B60K 35/00* (2006.01)

(52) U.S. Cl.
CPC ....... *G02B 27/0149* (2013.01); *G02B 27/286* (2013.01); *B60K 2350/1072* (2013.01); *B60K 2350/2052* (2013.01); *B60K 2350/2056* (2013.01); *B60K 2350/2095* (2013.01); *G02B 2027/0152* (2013.01)

(58) Field of Classification Search
CPC ........ G02B 5/32; G02B 27/28; G02B 27/283; G02B 27/286; G02B 27/288; G02B 27/01; G02B 27/0101; G02B 2027/0105; G02B 2027/0107; G02B 2027/0118; G02B 2027/013; G02B 2027/0192; G02B 2027/0194; G02B 2027/0196; G02B 2027/0198
USPC ............... 359/1, 13, 483.01, 488.01, 489.01, 359/489.07, 489.08, 489.11, 489.15, 359/489.16, 489.2, 491.01
See application file for complete search history.

(56) References Cited

U.S. PATENT DOCUMENTS

| | | | |
|---|---|---|---|
| 6,853,491 B1* | 2/2005 | Ruhle | .................. G02B 5/3016 349/11 |
| 8,873,149 B2 | 10/2014 | Bohn et al. | |
| 2012/0224062 A1 | 9/2012 | Lacoste et al. | |
| 2013/0100524 A1 | 4/2013 | Magarill et al. | |
| 2014/0184996 A1 | 7/2014 | Matsushita et al. | |
| 2014/0211322 A1 | 7/2014 | Bohn et al. | |
| 2015/0123879 A1 | 5/2015 | Aboshi | |
| 2017/0045738 A1* | 2/2017 | Kim | ......................... G02B 5/30 |
| 2017/0336628 A1* | 11/2017 | Kim | ................... G02B 27/0101 |

FOREIGN PATENT DOCUMENTS

| | | |
|---|---|---|
| KR | 10-1017032 B1 | 2/2011 |
| KR | 10-2011-0117719 A | 10/2011 |
| KR | 10-2015-0114977 A | 10/2015 |

\* cited by examiner

HEAD UP DISPLAY FOR VEHICLE

CROSS-REFERENCE TO RELATED APPLICATIONS

The present application claims priorities under 35 U.S.C. 119 to U.S. Provisional Application Nos. 62/294,303 (filed on Feb. 12, 2016) and 62/340,503 (filed on May 23, 2016), and to Korean Patent Application No. 10-2016-0079047 (filed on Jun. 24, 2016), which are hereby incorporated by reference in their entireties.

FIELD OF THE INVENTION

The present disclosure relates to a head up display for a vehicle, and more particularly, to a head up display for a vehicle in which an image light emitted from a display panel is reflected several times and then emitted.

BACKGROUND

A head up display for a vehicle is a device that is included in a vehicle to emit an image light toward a windshield of a vehicle. The head up display for a vehicle may display kinds of information including operation information while driving a vehicle.

The head up display for a vehicle includes a display panel to generate and output an image light, and at least one mirror to reflect the image light generated in the display panel.

The image light generated in the display panel may be incident onto the windshield by a mirror, and a driver may recognize a virtual image appearing ahead of the windshield.

SUMMARY

The present disclosure provides a head up display for a vehicle, capable of minimizing a width of the head up display in the forward and backward direction.

According to an embodiment of the present disclosure, there is provided a head up display for a vehicle, comprising a display panel configured to emit an image light; a polarized light plate configured to make the image light emitted from the display linearly polarized; a reflective mirror configured to reflect the image light on a windshield of a vehicle; a polarized light reflective mirror configured to be disposed to face the reflective mirror; and a phase delay mirror configured to convert a phase of the light inputted from the polarized light plate and reflect the converted phase to the polarized light reflective mirror, and to convert a phase of the light reflected from the polarized light reflective mirror and reflect the converted phase to the polarized light reflective mirror.

The phase delay mirror may be greater in size than each of the polarized light plate and the polarized light reflective mirror, and face between the polarized light plate and the polarized light reflective mirror, the polarized light plate, and the polarized light reflective mirror.

A linearly polarized light having the same waveform as the linearly polarized light emitted from the polarized light plate may be transmitted to the polarized light reflective mirror.

One surface of the phase delay mirror may include an overlapped area where an area facing one surface of the polarized light reflective mirror and an area facing one surface of the polarized light plate are overlapped.

The polarized light plate and the polarized light reflective mirror may be tilted in opposite directions.

At least a portion of the polarized light plate may be disposed under and between the polarized light reflective mirror and the phase delay mirror.

The phase delay mirror and the polarized light reflective mirror may draw closer as going upward.

The phase delay mirror and the polarized light reflective mirror may draw closer as going downward.

The head up display may further include a holder in which the polarized light plate, the polarized light reflective mirror and the phase delay mirror are fixed together.

The holder may include an inner holder that has an upper opening formed in the upper front portion, a front lower opening formed in lower front portion and a rear opening formed in the rear surface; the polarized light reflective mirror may be disposed in the front upper opening; the polarized light plate may be disposed in the front lower opening; and the phase delay mirror may be disposed in the rear opening.

The holder may further include a phase delay mirror cover configured to be coupled to the inner holder and to cover a rear surface of the phase delay mirror; and a polarized light reflective mirror cover configured to be coupled to the inner holder and to cover a front perimeter of the polarized light reflective mirror.

According to another embodiment of the present disclosure, there is provided a head up display for a vehicle, comprising a main body configured to have a space formed therein; a display panel configured to emit an image light; a reflective mirror configured to be disposed in the space and to reflect the image light to a windshield of a vehicle; and a mirror assembly configured to be disposed apart from the reflective mirror, wherein the mirror assembly includes a holder; a polarized light plate configured to be mounted in the holder and to make the image light emitted from the display linearly polarized; a polarized light reflective mirror configured to be mounted in the holder and to be disposed to face the reflective mirror; and a phase delay mirror configured to be mounted in the holder and to convert a phase of the light inputted from the polarized light plate and reflect the converted phase to the polarized light reflective mirror, and to convert a phase of the light reflected from the polarized light reflective mirror and reflect the converted phase to the polarized light reflective mirror.

The phase delay mirror may be greater in size than each of the polarized light plate and the polarized light reflective mirror, and face between the polarized light plate and the polarized light reflective mirror, the polarized light plate, and the polarized light reflective mirror.

A linearly polarized light having the same waveform as the linearly polarized light emitted from the polarized light plate may be transmitted to the polarized light reflective mirror.

The holder may include an inner holder that has an upper opening formed in the upper front portion, a front lower opening formed in lower front portion and a rear opening formed in the rear surface; the polarized light reflective mirror is disposed in the front upper opening; the polarized light plate is disposed in the front lower opening; and the phase delay mirror is disposed in the rear opening.

The holder may further include a phase delay mirror cover configured to be coupled to the inner holder and to cover a rear surface of the phase delay mirror, and a polarized light reflective mirror cover configured to be coupled to the inner holder and to cover a front perimeter of the polarized light reflective mirror.

According to the present disclosure, there are advantages that an optical path is formed between the polarized light reflective mirror and the phase delay mirror in a zigzag pattern, capable of disposing the polarized light reflective mirror and the phase delay mirror as closely as possible to each other, minimizing the width of the head up display for a vehicle in the back and forth direction, and making the head up display for a vehicle compact with a simple structure.

Further, there is an advantage of minimizing the total size of the head up display for a vehicle by optimally arranging a polarized light plate, a polarized light reflective mirror and a phase delay mirror.

Further, since the polarized light plate, the polarized light reflective mirror and the phase delay mirror may be mounted in a holder, and the holder may be mounted in a space of a main body, an assembly efficiency and maintainability of the polarized light reflective mirror and the phase delay mirror may be enhanced, compared with the case that they are independently mounted and separated in and from the main body.

DETAILED DESCRIPTION OF THE EMBODIMENTS

Hereinafter, a detailed embodiment of the present disclosure will be described with reference to the accompanying drawings.

Figure 1:
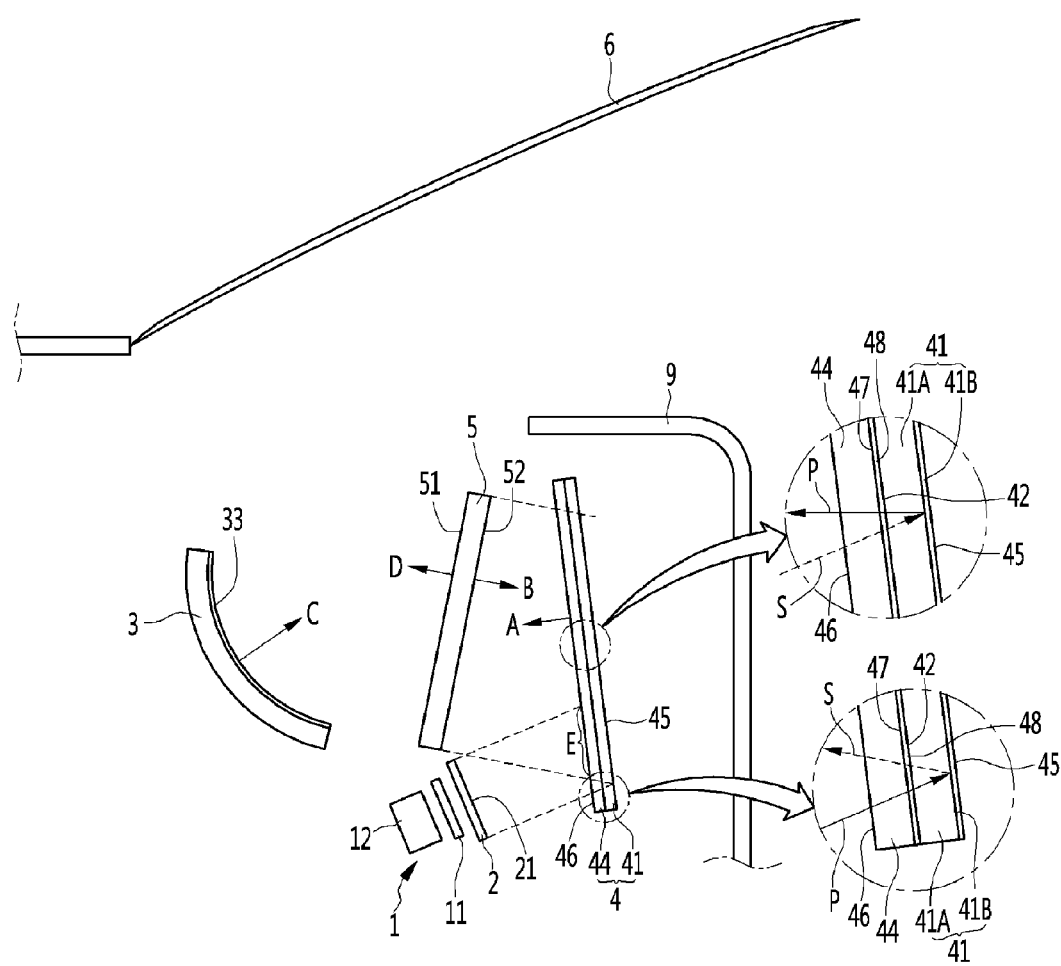
FIG. 1 is a side view illustrating a main configuration of a head up display for a vehicle according to one embodiment of the present disclosure.
Figure 2:
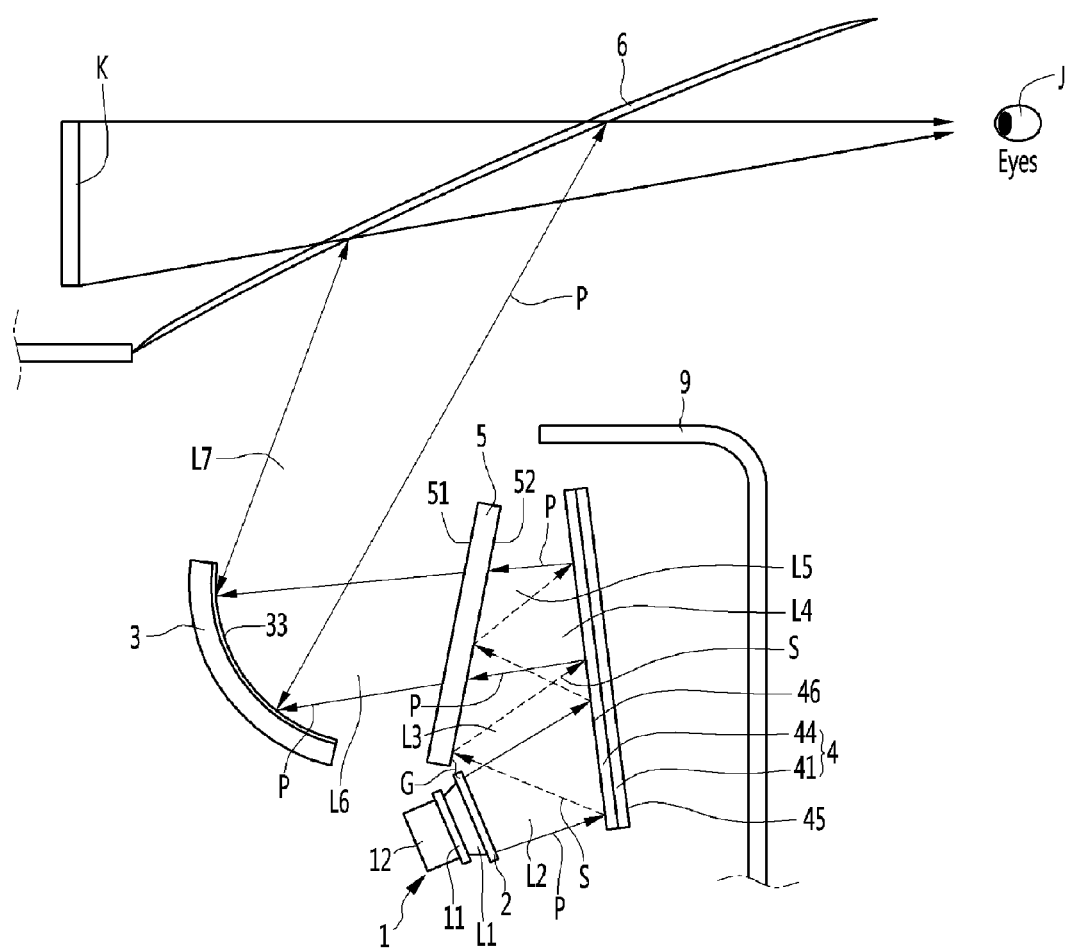
FIG. 2 is a side view illustrating a light path of a head up display for a vehicle according to one embodiment of the present disclosure.
Figure 3:
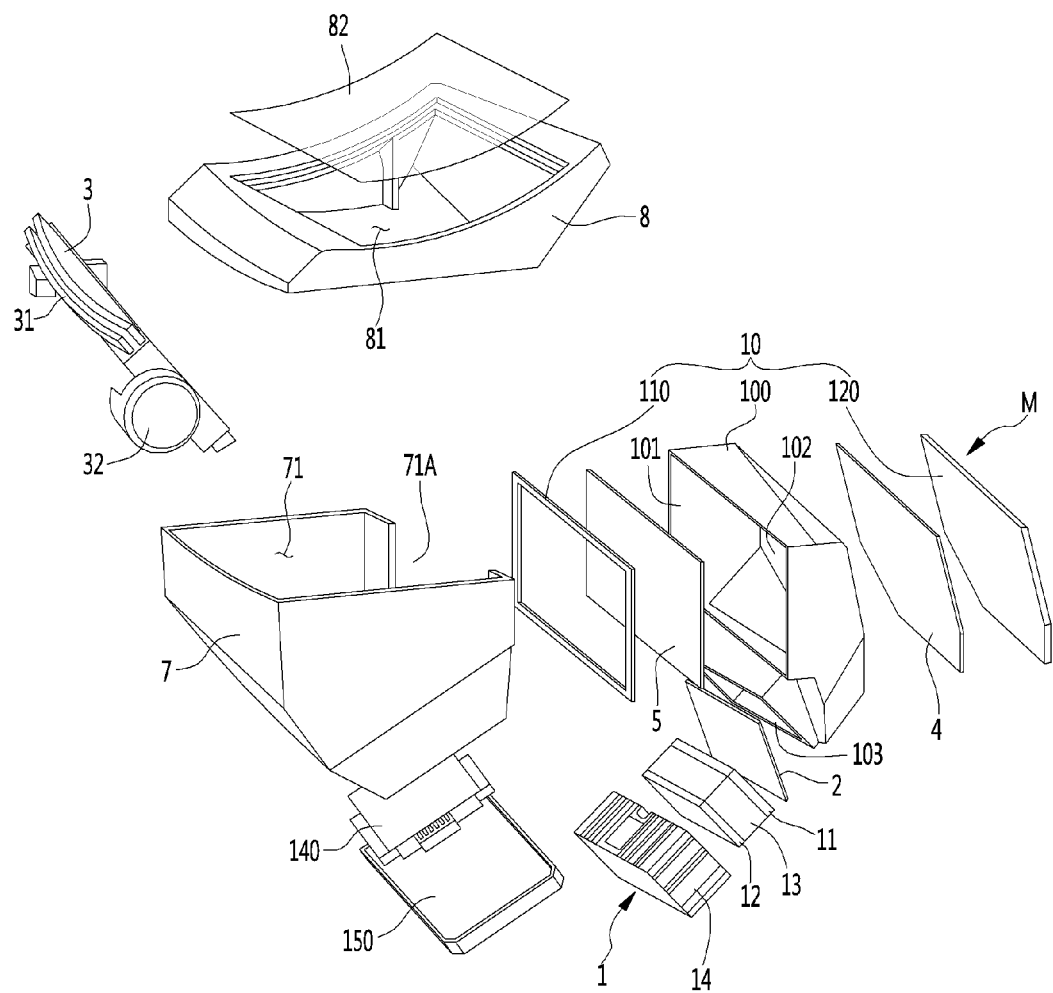
FIG. 3 is an exploded perspective view illustrating a head up display for a vehicle according to one embodiment of the present disclosure.
Figure 4:
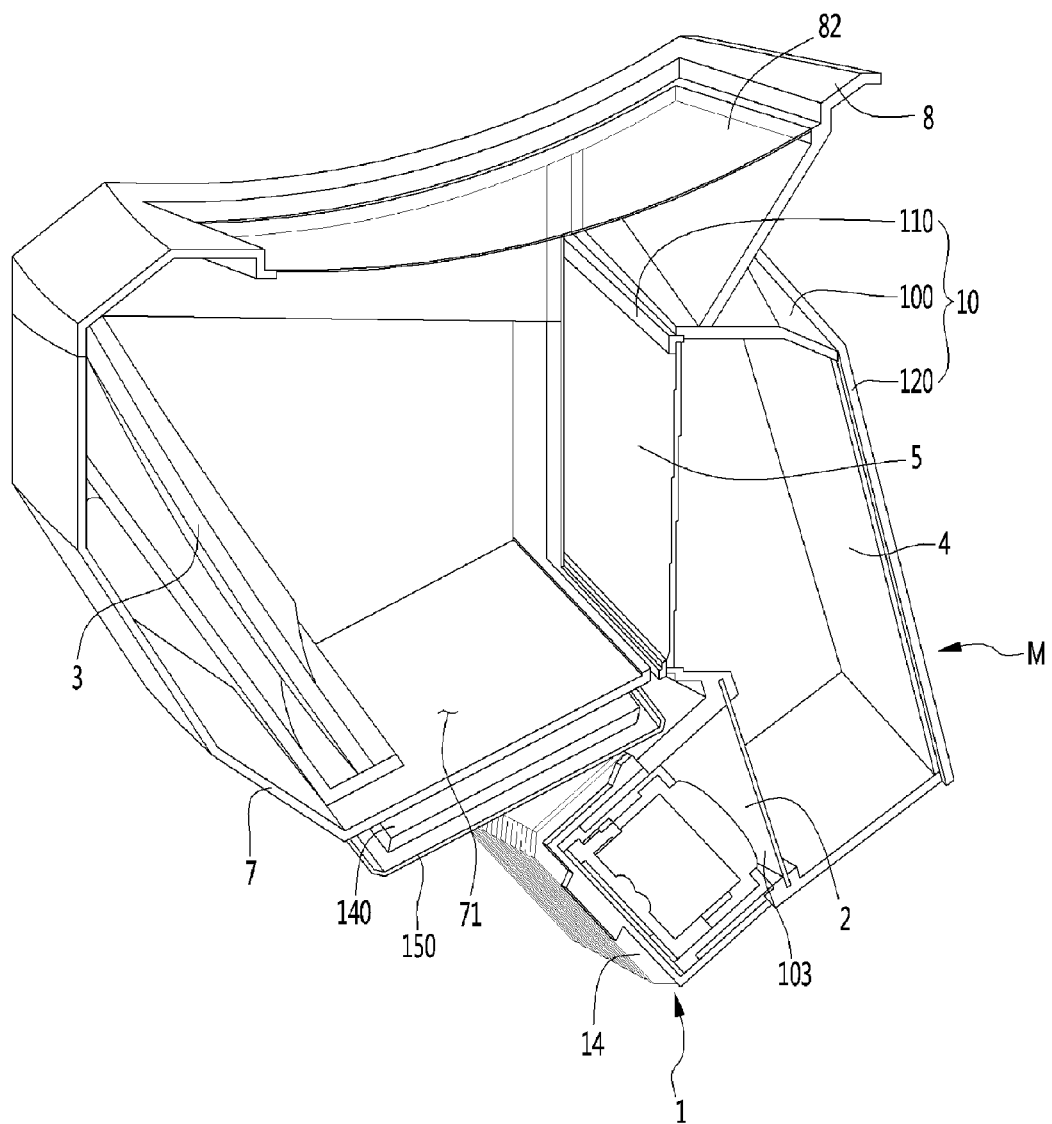
FIG. 4 is a cross-sectional view illustrating a head up display for a vehicle according to one embodiment of the present disclosure.

FIG. 1 is a side view illustrating a main configuration of a head up display for a vehicle according to one embodiment of the present disclosure, FIG. 2 is a side view illustrating a light path of a head up display for a vehicle according to one embodiment of the present disclosure, FIG. 3 is an exploded perspective view illustrating a head up display for a vehicle according to one embodiment of the present disclosure, and FIG. 4 is a cross-sectional view illustrating a head up display for a vehicle according to one embodiment of the present disclosure.

The head up display for a vehicle according to the present embodiment includes a display panel 1, a polarized light plate 2, a reflective mirror 3, a phase delay mirror 4 and a polarized light reflective mirror 5.

The head up display for a vehicle may emit an image light toward a windshield 6 of a vehicle (referred to as a windshield, hereinafter). The head up display for a vehicle may be received in or mounted on an instrument panel 9 in front of a driver's seat in a vehicle, and emit an image light in the upward direction.

The display panel 1 may emit an image light. The display panel 1 may emit an image light toward the polarized light plate 2. The display panel 1 is an image generating unit, which may be a display apparatus that may control an electrical signal to generate an image light, such as an LCD (Liquid Crystal Display) panel, an LED (Light Emitting Diode) panel and an OLED (Organic Light Emitting Diode) panel.

The display panel 1 may include a display device 11, and a light source 12 that emits light toward the display device 11.

The display panel 1 may further include a display cover 13 that guides the light emitted from the light source 12 to the display device 11.

The light source 12 may be a backlight unit (BLU) that emits light toward the display device 11. The light source 12 may be an LED and an OLED.

The light source 12 may generate heat when it is turned on, and the light source 12 may be in contact with a radiation device 14 that radiates heat generated in the light source 12.

The radiation device 14 may be a heat sink to radiate heat from the display panel 1. The radiation device 14 may be mounted on a main body 7 to be described. The radiation device 14 may be mounted in the main body 7 to be projected out of the main body 7. The radiation device 14 may have a display panel receiver formed to receive the display panel 1. The display panel 1 may be received in the display panel receiver, and emit an image light toward the polarized light plate 2 and between the radiation device 14 and the polarized light plate 2.

The polarized light plate 2 may linearly polarize the image light emitted from the display panel 1. The polarized light plate 2 may be configured of a linear polarizer that linearly polarizes the image light in one direction.

The display panel 1 may emit a non-polarized light that is not polarized, and the non-polarized light emitted from the display panel 1 may be polarized in the polarized light plate 2 in one direction. The polarized light plate 2 may emit a P wave linearly polarized light or an S wave linearly polarized light.

One surface of the polarized light plate 2 may be disposed to face the display panel 1. The other surface 21 of the polarized light plate 2 may be disposed to face the inside of a holder 10 to be described. The polarized light plate 2 may be disposed to cover a light emitting surface of the display panel 1. The polarized light plate 2 may be disposed between the display panel 1 and the phase delay mirror 4.

The image light emitted from the display panel 1 may be incident onto the polarized light plate 2 through the one surface of the polarized light plate 2, and the light polarized by the polarized light plate 2 may be emitted toward the inside of the holder 10 to be described.

The reflective mirror 3 may reflect the image light passing through the polarized light reflective mirror 5 toward the windshield 6.

The reflective mirror 3 may be disposed to be positioned in front of the polarized light reflective mirror 5. A rear surface 33 of the reflective mirror 3 may face the front surface 51 of the polarized light reflective mirror 5 in the forward and backward direction. The reflective mirror 3 may be a concave mirror.

The reflective mirror 3 may be received in the main body 7. The reflective mirror 3 may be mounted in the main body 7 tilted at a desired angle. The image light passing through the polarized light reflective mirror 5 may be reflected in the upward direction. Here, the upward direction may include both an upward direction tilted backward in a desired angle and an upward direction tilted forward in a desired angle as well as a vertical direction.

The reflective mirror 3 may be supported by a reflective mirror supporter 31. The front surface of the reflective mirror 3 may face the reflective mirror supporter 31 in the forward and backward direction. The reflective mirror supporter 31 may be received in the main body 7 together with the reflective mirror 3. The reflective mirror supporter 31 may be rotatably disposed in the main body 7. The reflective mirror supporter 31 may be connected to a motor 32 that rotates a rotation axis of the reflective mirror supporter 31. The motor 32 may be mounted in the main body 7. The reflective mirror 3 may be rotated together with the reflective mirror supporter 31 when the motor 32 is driven. The rotation axis may be a horizontal rotation axis, and the reflective mirror 3 may be rotated on the horizontal rotation axis in the upward and downward direction.

The head up display for a vehicle may form an optical path in which a light emitted from the polarized light plate 2 is reflected on each of the phase delay mirror 4 and the polarized light reflective mirror 5 at least once, as illustrated in FIG. 2.

The phase delay mirror 4 may be disposed in the rear of the polarized light reflective mirror 5, apart from the polarized light reflective mirror 5 in the forward and backward direction.

The polarized light reflective mirror 5 may be disposed to face the reflective mirror 3. The polarized light reflective mirror 5 may be disposed in the rear of the reflective mirror 3, apart from the reflective mirror 3 in the forward and backward direction. The polarized light reflective mirror 5 may be disposed between the reflective mirror 3 and the phase delay mirror 4 in the forward and backward direction, apart from each of the reflective mirror 3 and the phase delay mirror 4.

The polarized light reflective mirror 5 is a polarized light separator, which may reflect any one of the P wave linearly polarized light (P) and the S wave linearly polarized light (S), and transmit the other one therethrough.

The phase delay mirror 4 may convert a phase of the linearly polarized light incident on its front surface 46 by 90° to be reflected in the forward direction.

The phase delay mirror 4 may include a rear mirror 41, and a phase retarder 44 disposed in the front surface 42 of the rear mirror 41. The phase delay mirror 4 may be a retarder-mirror.

The rear mirror 41 may include a transparent plate 41A, and a reflective layer 41B formed in the rear surface of the transparent plate 41A.

It is desirable for the phase delay mirror 4 that the rear mirror 41 and the phase retarder 44 approach each other as closely as possible, and that the rear mirror 41 and the phase retarder 44 are integrated in one body. The phase retarder 44 may be attached to the front surface 42 of the rear mirror 41 using an adhesive 48. The rear surface 47 of the phase retarder 44 may be attached to the front surface 42 of the transparent plate 41A using an adhesive, particularly, a transparent adhesive.

The phase retarder 44 is an optical device to convert a polarized state of light passing through it, which may be a quarter wave plate. The phase retarder 44 may be configured of a circular polarizer, which may delay a phase of a linearly polarized light incident on its front surface by a quarter wave, and a phase of a linearly polarized light reflected by the rear mirror 41 by a quarter wave.

When a linearly polarized light is incident on the front surface 46 of the phase delay mirror 4, the linearly polarized light passes through the phase retarder 44 so that its phase is converted by a quarter wave, and such a phase converted image light may be reflected by the rear mirror 41 in the forward direction. The image light reflected by the rear mirror 41 in the forward direction may pass through the phase retarder 44 again so that its phase may be converted by a quarter wave. As such, the light that has been converted by a quarter wave two times in the phase delay mirror 4 may be emitted in the forward direction of the phase retarder 44. Here, the linearly polarized light emitted from the phase delay mirror 4 may have a waveform whose phase is different by 90° from the linearly polarized light incident on the phase delay mirror 4.

When a P wave linearly polarized light (P) is incident onto the phase delay mirror 4 in front of the phase delay mirror 4, the phase delay mirror 4 may emit an S wave linearly polarized light (S) in the forward direction, the S wave linearly polarized light (S) being produced by converting the phase of the P wave linearly polarized light (P) by 90°.

On the contrary, when the S wave linearly polarized light (S) is incident onto the phase delay mirror 4 in front of the phase delay mirror 4, the phase delay mirror 4 may emit the P wave linearly polarized light (P) in the forward direction, the P wave linearly polarized light (P) being produced by converting the phase of the S wave linearly polarized light (S) by 90°.

Meanwhile, the rear mirror 41 may be a flat mirror whose front surface 42 has a flat surface. Since the front surface 42 of the rear mirror 41 has a flat surface, the rear surface 47 of the phase retarder 44 may be tightly attached to the front surface 42 of the rear mirror 41 and remain on the front surface 42 of the rear mirror 41 with a high reliability, compared with a case that the front surface 42 of the rear mirror 41 has a curved surface.

The front surface 46 of the phase retarder 44 may face the rear surface 52 of the polarized light reflective mirror 5 in the forward and backward direction. Here, the front surface 46 of the phase retarder 44 may be the front surface of the phase delay mirror 4.

In the head up display for a vehicle, a distance from the windshield 6 of the vehicle to a virtual image K may be determined by a total optical path length from the display panel 1 to the windshield 6.

In the head up display for a vehicle, the longer such a total optical path, the longer the distance from the windshield 6 to the virtual image K. And, the shorter the total optical path, the shorter the distance from the windshield 6 to the virtual image K.

When a distance L from the windshield 6 to the virtual image K is fixed in the head up display for a vehicle, the shorter the distance between the phase delay mirror 4 and the polarized light reflective mirror 5, the shorter the width of a total head up display for a vehicle in the forward and backward direction. And, it may be possible to minimize the total size of the head up display for a vehicle.

It is desirable that the head up display for a vehicle obtains a total optical path having a suitable distance from the windshield 6 to the virtual image K while disposing the phase delay mirror 4 and the polarized light reflective mirror 5 as close to each other as possible.

Generally, a suitable range of the distance from the windshield 6 to the virtual image K may be 1 m~3 m. And, it is desirable that the polarized light plate 2, the phase delay mirror 4 and the polarized light reflective mirror 5 are disposed as close to one another as possible, so as to have such a suitable range of optical path.

To do this, as illustrated in FIG. 2, it may be configured that the polarized light plate 2 emits a linearly polarized light toward the phase delay mirror 4, and the polarized light reflective mirror 5 passes a linearly polarized light therethrough, which has the same waveform as that of the linearly polarized light emitted from the polarized light plate 2. Specifically, when the polarized light plate 2 polarizes an image light emitted from the display panel 1 into a P wave linearly polarized light as shown in FIG. 2, the polarized light reflective mirror 5 may reflect an S wave linearly polarized light and pass the P wave linearly polarized light therethrough. On the other hand, if alternately the polarized light plate 2 were configured to polarize the image light emitted from the display panel 1 into an S wave linearly polarized light, the polarized light reflective mirror 5 would be configured to reflect the P wave linearly polarized light and pass the S wave linearly polarized light therethrough.

The phase delay mirror 4 may convert a phase of light incident from the polarized light plate 2 to reflect it to the polarized light reflective mirror 5. The polarized light reflective mirror 5 may reflect the light reflected on the phase delay mirror 4 to the phase delay mirror 4 again. The phase delay mirror 4 may convert a phase of the light reflected on the polarized light reflective mirror 5 and reflect it to the polarized light reflective mirror 5.

As illustrated in FIG. 2, the image light emitted from the polarized light plate 2 may be reflected by the phase delay mirror 4 two times in total, and the linearly polarized light reflected on the phase delay mirror 4 may be reflected by the polarized light reflective mirror 5 once, such that the image light may be reflected by the phase delay mirror 4 and the polarized light reflective mirror 5 three times in total.

The linearly polarized light entered from the polarized light plate 2 into a space between the phase delay mirror 4 and the polarized light reflective mirror 5 may form an optical path in a zigzag shape between the phase delay mirror 4 and the polarized light reflective mirror 5 and then pass through the polarized light reflective mirror 5. The linearly polarized light that has passed through the polarized light reflective mirror 5 may be reflected on the reflective mirror 3 and then onto the windshield 6.

That is, a total optical path from the display panel 1 to the windshield 6 may include an optical path L1 of an image light incident from the display panel 1 onto the polarized light plate 2, an optical path L2 of a linearly polarized light P that is incident from the polarized light plate 2 onto the phase delay mirror 4 for the first time, an optical path L3 of the linearly polarized light (S) that is primarily reflected on the phase delay mirror 4 and incident onto the polarized light reflective mirror 5, an optical path L4 of a linearly polarized light (S) that is reflected on the polarized light reflective mirror 5 and incident onto the phase delay mirror 4, an optical path L5 of the linearly polarized light (P) that is reflected from the phase delay mirror 4 onto the polarized light reflective mirror 5, an optical path L6 of the linearly polarized light (P) that passes through the polarized light reflective mirror 5 and is incident onto the reflective mirror 3, and an optical path L7 of the linearly polarized light (P) that is reflected from the reflective mirror 3 onto the windshield 6, wherein a distance from the windshield 6 to a virtual image J may be determined by summing the optical paths L1-L7.

In the present embodiment, the phase delay mirror 4 may be greater in length than each of the polarized light plate 2 and the polarized light reflective mirror 5 in order to reflect the linearly polarized light three times as described above. Further, the phase delay mirror 4 may be disposed to face a space G between the polarized light plate 2 and the polarized light reflective mirror 5, the polarized light plate 2 and the polarized light reflective mirror 5. When disposing the polarized light plate 2 closely to the phase delay mirror 4 and the polarized light reflective mirror 5, it may be easy to obtain an optical path in which the linearly polarized light is reflected three times, and to design the head up display for a vehicle as compact as possible.

Further, one surface of the phase delay mirror 4 may include an overlapped area E where an area facing one surface of the polarized light reflective mirror 5 and an area facing one surface of the polarized light plate 2 are overlapped. The front surface 46 of the phase delay mirror 4 may face the rear surface 52 of the polarized light reflective mirror 5 and the rear surface 21 of the polarized light plate 2, and the front surface 46 of the phase delay mirror 4 may include an overlapped area E where an area facing the rear surface of the polarized light reflective mirror 5 and an area facing the rear surface of the polarized light plate 2 are overlapped.

The polarized light reflective mirror 5 may be disposed out of the path in which the linearly polarized light emitted from the polarized light plate 2 is incident onto the phase delay mirror 4.

At least one of the polarized light plate 2, the phase delay mirror 4 and the polarized light reflective mirror 5 may be tiltedly disposed.

Inclined angles of the phase delay mirror 4 and the polarized light reflective mirror 5 may be determined according to a position and a disposed angle of the polarized light plate 2.

The polarized light plate 2 may be disposed in the manner that one surface 21 of it faces a space between and the phase delay mirror 4 and the polarized light reflective mirror 5, and the phase delay mirror 4.

At least a portion of the polarized light plate 2 may be disposed under and between the polarized light reflective mirror 5 and the phase delay mirror 4. In this case, the display panel 1 may emit an image light upward. Here, the emitting upward may mean that the display panel may emit the image light tilted at a desired angle in the backward and upward direction.

Further, one surface 21 of the polarized light plate 2 may be disposed to face the front surface 46 of the phase delay mirror 4.

Further, the phase delay mirror 4 and the polarized light reflective mirror 5 may be disposed to be closer proceeding upwardly.

The phase delay mirror 4 and the polarized light reflective mirror 5 both may be tiltedly disposed. In this case, the front surface 46 of the phase delay mirror 4 may be disposed tiltedly in the forward and downward direction A, and the rear surface 52 of the polarized light reflective mirror 5 may be disposed tiltedly in the backward and downward direction B.

Further, the polarized light reflective mirror 5 and the reflective mirror 3 may be tilted in opposite directions. The rear surface 33 of the reflective mirror 3 may be tiltedly disposed toward in the backward and upward direction C, and the front surface 51 of the polarized light reflective mirror 5 may be tiltedly disposed in the forward and upward direction D. The polarized light reflective mirror 5 and the reflective mirror 3 may be disposed to be closer to each other as going downward.

The head up display for a vehicle may include a main body 7 having a space 71 formed therein. The main body 7 may have a shape whose upper surface is opened, and a rear opening 71A in the rear surface which is covered by a phase delay mirror cover 120 to be described below.

The head up display for a vehicle may include a top cover 8 that is disposed on the upper portion of the main body 71 and has an upper opening 81 formed therein. The head up display for a vehicle may further include a window 82 disposed in the upper opening 81.

The head up display for a vehicle may further include a holder 10 to which at least one of the polarized light plate 2, the polarized light reflective mirror 5 and the phase delay mirror 4 is fixed.

The holder 10 may have the polarized light reflective mirror 5 and the phase delay mirror 4, both of them being fixed together thereto. The polarized light reflective mirror 5 and the phase delay mirror 4 of the holder 10 may configure a mirror assembly M.

The polarized light plate 2 may be fixed to the holder 10, together with the polarized light reflective mirror 5 and the phase delay mirror 4. In this case, the holder 10, the polarized light plate 2, the polarized light reflective mirror 5 and the phase delay mirror 4 may configure the mirror assembly M.

The mirror assembly M may be mounted in the main body 7. At least a portion of the mirror assembly M may insert into the space 71 to be received in the space 71. The mirror assembly M may be coupled to the main body 7 such that the other portion of the mirror assembly M which does not insert into the space 71 is exposed to the outside of the main body 7. The mirror assembly M may be disposed apart from the reflective mirror 3.

The reflective mirror 3 and the holder 10 may be disposed apart from each other.

The holder 10 may be configured of a single member, and it may also be configured of a combined body of a plurality of members. The polarized light plate 2, the polarized light reflective mirror 5 and the phase delay mirror 4 may insert into the main body 7 in the state that they are supported to the holder 10, and they may be fixed to the main body 7 by the holder 10.

The holder 10 may include an inner holder 100.

The inner holder 100 may have a front upper opening 101 formed in the front upper portion thereof. The polarized light reflective mirror 5 may be disposed in the front upper opening 101.

The inner holder 100 may have a rear opening 102 formed in the rear surface thereof. The phase delay mirror 4 may be disposed in the rear opening 102.

The inner holder 100 may have a front lower opening 103 formed in the front lower portion thereof. The polarized light plate 2 may be disposed in the front lower opening 103.

The holder 10 may further include a polarized light reflective mirror cover 110 that is coupled to the inner holder 100 and covers front edges of the polarized light reflective mirror 5. The holder 10 may further include a phase delay mirror cover 120 that is coupled to the inner holder 100 and covers the rear surface 45 of the phase delay mirror 4.

The polarized light reflective mirror cover 110 may cover the front edges of the polarized light reflective mirror 5 properly seated in the inner holder 100, and the polarized light reflective mirror 5 may be fixed between the polarized light reflective mirror cover 110 and the inner holder 100.

The phase delay mirror cover 120 may cover the rear surface of the phase delay mirror 4 properly seated in the inner holder 100, and the phase delay mirror 4 may be fixed between the phase delay mirror cover 120 and the inner holder 100.

The head up display for a vehicle may further include a control substrate 140 configured to control the display panel 1, and a shield 150 configured to protect the control substrate 140.

The control substrate 140 may be disposed in an inner lower portion of the space 71, or under the bottom plate of the main body 7. The shield 150 may be disposed to surround the control substrate 140.

Hereinafter, the operation of the present disclosure having the above-described configuration will be described as follows.

First, the display panel 1 may be turned on to emit an image light. An image light emitted from the display panel 1 may pass through the polarized light plate 2 to be polarized into a P wave linearly polarized light (P) or an S wave linearly polarized light (S).

Hereinafter, first, an example where the polarized light plate 2 and the polarized light reflective mirror 5 each pass the P wave linearly polarized light therethrough will be described as follows.

The P wave linearly polarized light (P) emitted from the polarized light plate 2 may be incident onto the front surface 46 of the phase delay mirror 4, and the phase delay mirror 4 may reflect the S wave linearly polarized light (S) whose wavelength is produced by converting the P wave linearly polarized light (P) by 90°. The S wave linearly polarized light (S) emitted from the phase delay mirror 4 may be reflected onto the polarized light reflective mirror 5 disposed in front of the polarized delay mirror 4.

The S wave linearly polarized light (S) emitted from the phase delay mirror 4 onto the polarized light reflective mirror 5 may not pass through the polarized light reflective mirror 5 but may be reflected by the polarized light reflective mirror 5 in the backward direction.

The S wave linearly polarized light (S) reflected by the polarized light reflective mirror 5 in the backward direction may be incident onto the front surface 46 of the phase delay mirror 4, and the P wave linearly polarized light (P) whose wavelength is produced by converting that of the S wave linearly polarized light (S) by 90° may be reflected onto the phase delay mirror 4. The P wave linearly polarized light (P) emitted from the phase delay mirror 4 may be reflected onto the polarized light reflective mirror 5 disposed in front of the phase delay mirror 4.

As such, the P wave linearly polarized light (P) emitted from the phase delay mirror 4 to the polarized light reflective mirror 5 may pass through the polarized light reflective mirror 5 to be incident onto the rear surface 33 of the reflective mirror 3, and the reflective mirror 3 may reflect such image light onto the windshield 6.

The virtual image K positioned in front of the windshield 6 may be recognized by eyes J of a driver who operates a vehicle.

Meanwhile, an alternative example where an S wave linearly polarized light passes through each of the polarized light plate 2 and the polarized light reflective mirror 5 is described as follows.

The S wave linearly polarized light emitted from the polarized light plate 2 may be incident onto the front surface 46 of the phase delay mirror 4, and phase delay mirror 4 may reflect the P wave linearly polarized light whose wavelength is produced by converting the S wave linearly polarized light S by 90°. The P wave linearly polarized light emitted from the phase delay mirror 4 may be reflected onto the polarized light reflective mirror 5 disposed in front of the polarized delay mirror 4.

The P wave linearly polarized light emitted from the phase delay mirror 4 onto the polarized light reflective mirror 5 may not pass through the polarized light reflective mirror 5 but may be reflected by the polarized light reflective mirror 5 in the backward direction.

The P wave linearly polarized light P reflected by the polarized light reflective mirror 5 in the backward direction may be incident onto the front surface 46 of the phase delay mirror 4, and the phase delay mirror 4 may reflect the S wave linearly polarized light whose wavelength is produced by converting that of the P wave linearly polarized light by 90°. The S wave linearly polarized light emitted from the phase delay mirror 4 may be reflected to the polarized light reflective mirror 5 disposed in front of the phase delay mirror 4.

As such, the S wave linearly polarized light emitted from the phase delay mirror 4 to the polarized light reflective mirror 5 may pass through the polarized light reflective mirror 5 to be incident onto the rear surface 33 of the reflective mirror 3, and the reflective mirror 3 may reflect such image light onto the windshield 6.

The virtual image K positioned in front of the windshield 6 may be recognized by eyes J of a driver who operates a vehicle.

Figure 5:
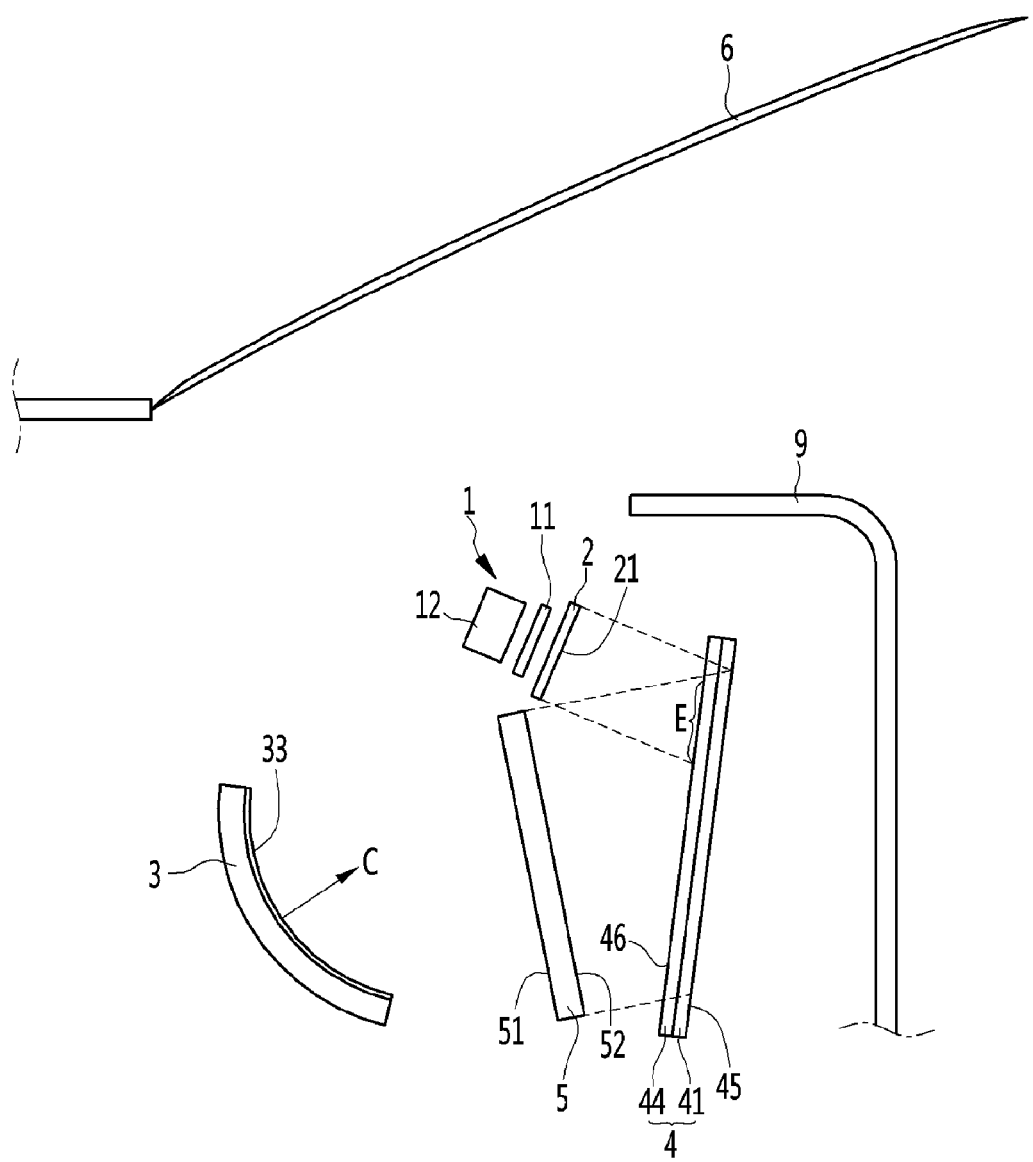
FIG. 5 is a side view illustrating a head up display for a vehicle according to another embodiment of the present disclosure.

FIG. 5 is a side view illustrating a head up display for a vehicle according to another embodiment of the present disclosure.

As illustrated in FIG. 5, in the head up display for a vehicle according to the present embodiment, at least a portion of a polarized light plate 2 may be disposed above and between a polarized light reflective mirror 5 and a phase delay mirror 4.

In this case, the display panel 1 may emit an image light downwardly. Here, a downward emission may mean that the display panel 1 tiltedly emits an image light toward a backward lower portion in a desired angle.

One surface 21 of the polarized light plate 2 may be disposed to face a front surface 46 of the phase delay mirror 4.

Further, the phase delay mirror 4 and the polarized light reflective mirror 5 may be disposed to be closer each other proceeding downwardly.

Both of the phase delay mirror 4 and the polarized light reflective mirror 5 may be tiltedly disposed. In this case, the upper surface 46 of the phase delay mirror 4 may be tiltedly disposed in the forward and upward direction, and the polarized light reflective mirror 5 may be tiltedly disposed in the backward and upward direction.

Further, the polarized light reflective mirror 5 may be tilted in the same direction as the reflective mirror 3. The rear surface 33 of the reflective mirror 3 may be tiltedly disposed in the backward and upward direction C, and the polarized light reflective mirror 5 may be tiltedly disposed in the forward and downward direction.

Since the present embedment is different from the one embodiment of the present disclosure in positions and disposition angles of the display panel 1 and the polarized light plate 2, and disposition angles of the phase delay mirror 4 and the polarized light reflective mirror 5 and is similar to the one embodiment of the present disclosure in other configuration and operation, same reference symbols are used and detailed description thereof is omitted.

The above description is only an illustrative description for a technical idea of the present disclosure, and those having ordinary skill in the art to which the present disclosure pertains may make modifications in various ways in a range within which the intrinsic characteristics of the present disclosure do not depart.

Accordingly, the embodiments disclosed in the present disclosure have been described for the description of the present disclosure, rather than for the limitation thereof, and the spirit and scope of the present disclosure are not limited by the embodiments.

The scope of the present disclosure must be interpreted based on the following claims, and all of the technical ideas within a range equivalent to the present disclosure should be interpreted as being included in the right scope of the present disclosure.

What is claimed is:

1. A head up display for a vehicle, comprising:
    a display panel configured to emit an image light;
    a polarized light plate configured to convert the image light emitted from the display panel into linearly polarized light;
    a phase delay mirror configured to receive light from the polarized light plate;
    a polarized light reflective mirror configured to receive light reflected from the phase delay mirror; and
    a reflective mirror,
    wherein the phase delay mirror is further configured to convert a phase of the light received from the polarized light plate into a first converted phase, and to reflect the first converted phase to the polarized light reflective mirror,
    wherein the polarized light reflective mirror is further configured to reflect the first converted phase back to the phase delay mirror,
    wherein the phase delay mirror is further configured to convert the first converted phase of the light reflected from the polarized light reflective mirror into a second converted phase, and to reflect the second converted phase back to the polarized light reflective mirror,
    wherein the polarized light reflective mirror is further configured to pass the second converted phase to the reflective mirror, and
    wherein the reflective mirror is configured to reflect the second converted phase onto a windshield of a vehicle.

2. The head up display of claim 1, wherein the phase delay mirror is larger in size than each of the polarized light plate and the polarized light reflective mirror, and
    wherein the phase delay mirror faces the polarized light plate and the polarized light reflective mirror.

3. The head up display of claim 1, wherein a linearly polarized light having the same waveform as the linearly polarized light emitted from the polarized light plate is transmitted to the polarized light reflective mirror.

4. The head up display of claim 1, wherein a surface of the phase delay mirror includes an overlapped area where an area facing the polarized light reflective mirror and an area facing the polarized light plate are overlapped.

5. The head up display of claim 1, wherein the polarized light plate and the polarized light reflective mirror are non-parallel with one another.

6. The head up display of claim 1, wherein a portion of the polarized light plate is disposed between the polarized light reflective mirror and the phase delay mirror.

7. The head up display of claim 1, wherein uppermost portions of the phase delay mirror and the polarized light reflective mirror are closer to one another than lowermost portions of the phase delay mirror and the polarized light reflective mirror.

8. The head up display of claim 1, wherein lowermost portions of the phase delay mirror and the polarized light reflective mirror are closer to one another than uppermost portions of the phase delay mirror and the polarized light reflective mirror.

9. The head up display of claim 1, further comprising a holder in which the polarized light plate, the polarized light reflective mirror and the phase delay mirror are arranged.

10. The head up display of claim 9, wherein the holder includes an inner holder having a front upper opening located in an upper front portion of the inner holder, a front lower opening located in a lower front portion of the inner holder, and a rear opening located in a rear portion of the inner holder,
wherein the polarized light reflective mirror is disposed in the front upper opening,
wherein the polarized light plate is disposed in the front lower opening, and
wherein the phase delay mirror is disposed in the rear opening.

11. The head up display of claim 10, wherein the holder further includes:
a phase delay mirror cover configured to be coupled to the inner holder and to cover a rear surface of the phase delay mirror; and
a polarized light reflective mirror cover configured to be coupled to the inner holder and to cover a front perimeter of the polarized light reflective mirror.

12. A head up display for a vehicle, comprising:
a main body having a space therein;
a display panel configured to emit an image light;
a reflective mirror disposed in the space; and
a mirror assembly disposed apart from the reflective mirror,
wherein the mirror assembly includes:
a holder;
a polarized light plate located in the holder and configured to convert the image light emitted from the display panel into linearly polarized light;
a phase delay mirror located in the holder and configured to receive light from the polarized light plate; and
a polarized light reflective mirror located in the holder and configured to receive light reflected from the phase delay mirror,
wherein the phase delay mirror is further configured to convert a phase of the light received from the polarized light plate into a first converted phase, and to reflect the first converted phase to the polarized light reflective mirror,
wherein the polarized light reflective mirror is further configured to reflect the first converted phase back to the phase delay mirror,
wherein the phase delay mirror is further configured to convert the first converted phase of the light reflected from the polarized light reflective mirror into a second converted phase, and to reflect the second converted phase back to the polarized light reflective mirror,
wherein the polarized light reflective mirror is further configured to pass the second converted phase to the reflective mirror, and
wherein the reflective mirror is configured to reflect the second converted phase onto a windshield of a vehicle.

13. The head up display of claim 12, wherein the phase delay mirror is larger in size than each of the polarized light plate and the polarized light reflective mirror, and
wherein the phase delay mirror faces the polarized light plate and the polarized light reflective mirror.

14. The head up display of claim 12, wherein a linearly polarized light having the same waveform as the linearly polarized light emitted from the polarized light plate is transmitted to the polarized light reflective mirror.

15. The head up display of claim 12, wherein a surface of the phase delay mirror includes an overlapped area where an area facing the polarized light reflective mirror and an area facing the polarized light plate are overlapped.

16. The head up display of claim 12, wherein the polarized light plate and the polarized light reflective mirror are non-parallel with one another.

17. The head up display of claim 12, wherein a portion of the polarized light plate is disposed between the polarized light reflective mirror and the phase delay mirror, and
wherein uppermost portions of the phase delay mirror and the polarized light reflective mirror are closer to one another than lowermost portions of the phase delay mirror and the polarized light reflective mirror.

18. The head up display of claim 12, wherein the holder includes an inner holder having a front upper opening located in an upper front portion of the inner holder, a front lower opening located in a lower front portion of the inner holder, and a rear opening located in a rear portion of the inner holder,
wherein the polarized light reflective mirror is disposed in the front upper opening,
wherein the polarized light plate is disposed in the front lower opening, and
wherein the phase delay mirror is disposed in the rear opening.

19. The head up display of claim 18, wherein the holder further includes a phase delay mirror cover configured to be coupled to the inner holder and to cover a rear surface of the phase delay mirror.

20. The head up display of claim 18, wherein the holder further includes a polarized light reflective mirror cover configured to be coupled to the inner holder and to cover a front perimeter of the polarized light reflective mirror.

* * * * *